March 27, 1945.          J. L. WOODWORTH          2,372,539
CARRIER CURRENT APPARATUS
Filed April 17, 1943          2 Sheets-Sheet 1
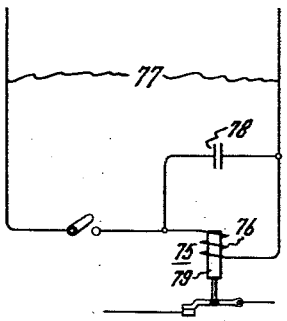
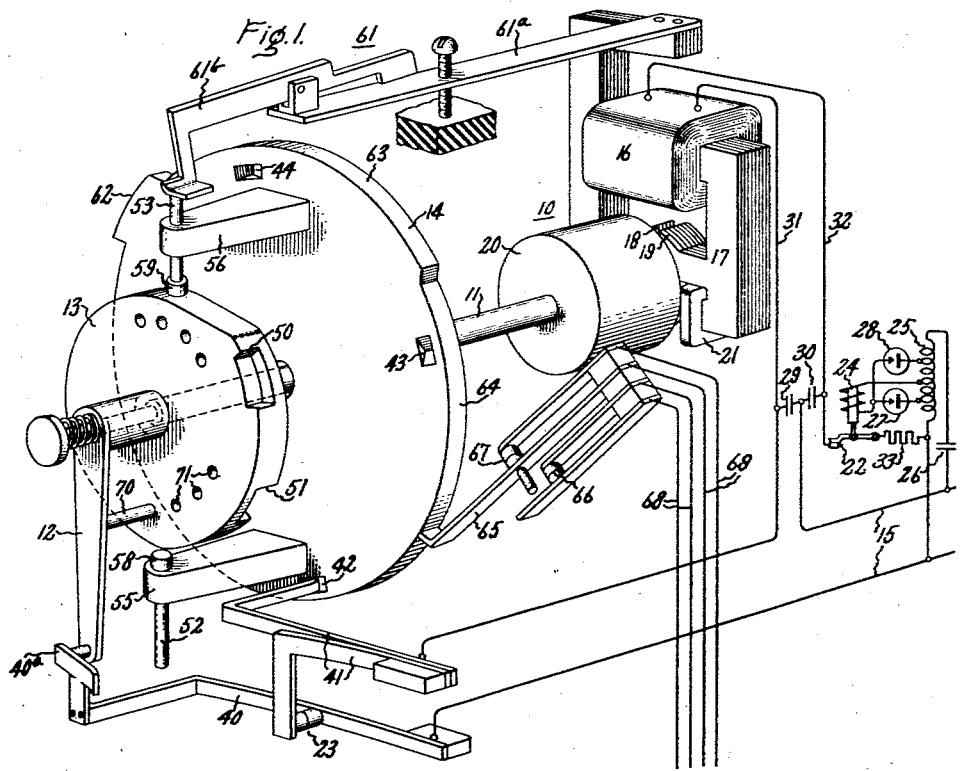
Inventor:
John L. Woodworth,
by Harry E. Dunham
His Attorney.

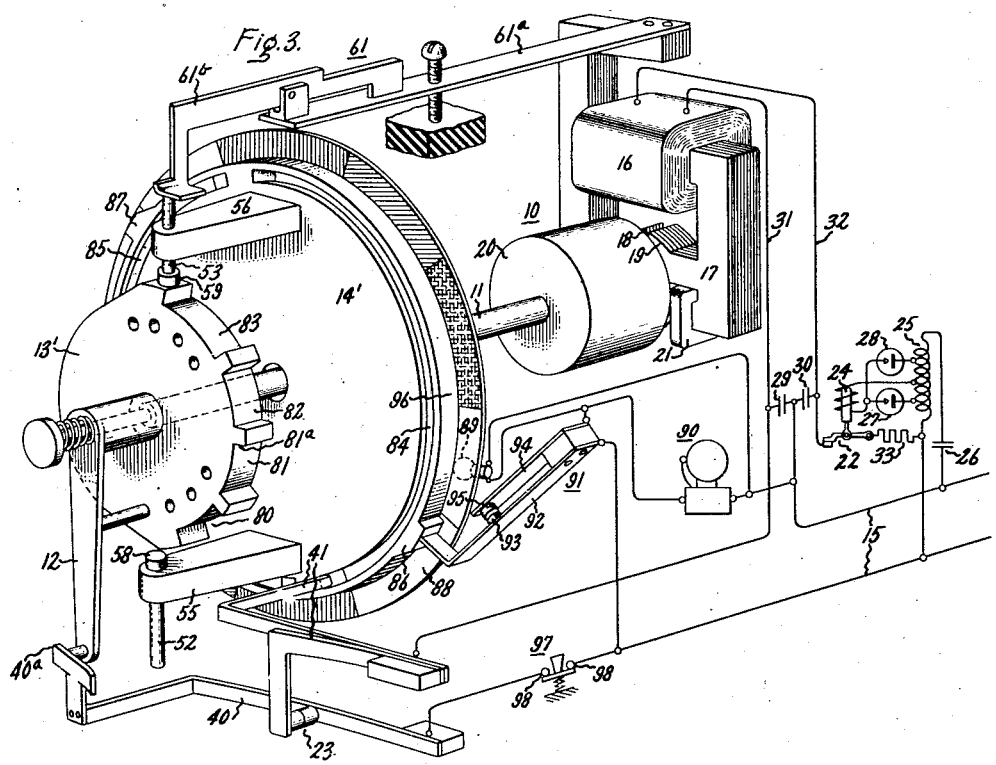

Patented Mar. 27, 1945

2,372,539

UNITED STATES PATENT OFFICE 2,372,539

CARRIER CURRENT APPARATUS

John L. Woodworth, Schenectady, N. Y., assignor to General Electric Company, a corporation of New York Application April 17, 1943, Serial No. 483,519

13 Claims. (Cl. 172—274)

This invention relates to carrier current apparatus.

This application is a continuation in part of my copending application, S. N. 420,851, filed November 28, 1941, now Patent No. 2,324,344, July 13, 1943, and assigned to the same assignee as the present invention.

The principal objects and advantages of my invention will be apparent when considered in conjunction with the following specification and accompanying drawings.

The features of my invention which I believe to be novel are set forth with particularity in the appended claims. My invention itself, both as to its organization and manner of operation, together with further objects and advantages thereof may best be understood by reference to the following description taken in connection with the accompanying drawings in which Fig. 1 illustrates schematically, and partly in perspective, a carrier current receiver embodying my invention; Fig. 2 illustrates schematically a different application of a principle utilized in the apparatus of Fig. 1; and Fig. 3 illustrates a modification of the apparatus shown in Fig. 1.

In Fig. 1 there is shown a carrier current receiver including electric translating means or inductive device in the form of a self-starting synchronous motor 10 driving a shaft 11 in a clockwise direction at a slow speed, as for example, one revolution per minute, a switch arm 12 keyed to the shaft 11, a driving member or operating disc 13 and a driven member such as a cam 14 loosely journaled on the shaft 11. The motor 10 is energized in a manner to be described later from a main supply 15 of alternating potential.

It is preferred that the self-starting synchronous motor 10 be of the form described and claimed in U. S. Letters Patent 1,768,386, issued on June 24, 1930, to Henry E. Warren, entitled Motor rotor, and assigned to the Warren Telechron Company. Briefly, this motor includes an armature coil 16 to which potential from the main conductors 15 is supplied when it is desired that the motor operate. The armature coil 16 produces alternating magnetic flux in a yoke piece 17. The yoke piece 17 includes opposed pole pieces 18 and 19 which embrace a suitably journaled rotor, which is connected through suitable gears in a gear case 20 to drive the shaft 11. Each of the pole pieces 18 and 19 is divided into two portions and one portion of each pole piece is surrounded by a loop of conducting material. The loop 21 surrounding a portion of the pole piece 19 may be seen. The loop surrounding a portion of each pole piece acts to delay the transfer of magnetic flux through the corresponding portion of the pole piece, and produce a rotating magnetic field around the enclosed rotor, which thereupon turns and drives the shaft 11 through the gears in the gear case 20.

There are two switches 22 and 23 connected with the motor 10, and the circuit connections are so arranged that opening of either switch 22 or 23 is effective to produce operation of the motor 10 while such operation is not produced if both switches are either open or closed. The switch 22 is electromagnetically operated by a coil and plunger 24 to open position whenever carrier current impulses are present on the main conductors 15. To accomplish this an inductance 25 and condenser 26 are serially connected between the conductors 15 and are made resonant at the frequency of the carrier current impulses. A pair of rectifiers 27 and 28 are connected to rectify both half waves of the alternating carrier current potentials appearing across the inductance 25 and to impress the resulting rectified current across the coil 24 of the switch 22 to open the switch.

Opening of the switch 22 is effective to produce operation of the motor 10 by reason of connections including two condensers 29 and 30 which are connected in series between the two conductors 31 and 32 leading to the armature 16 of the motor 10. One of the main conductors 15 is connected to a point between the condensers 29 and 30, while the other main conductor 15 is connected through a resistance 33, and through switch 22 to conductor 32. The size of condenser 29, as well as the size of condenser 30 for reasons to be explained later, are made of proper value to resonate at the frequency of power current flowing in the main conductors 15 with the inductance of the armature coil 16 of motor 10. Upon opening of the switch 22, the power voltage between the main conductors 15 is impressed across the condenser 29, and therefore across the condenser 30 and armature coil 16 in series. Since the condenser 30 and the inductance of coil 16 are resonant at the frequency of power current between the conductors 15, a voltage tends to appear across the inductance 16 which is higher than the voltage between conductors 15. The armature coil 16 must be suitably designed to operate the motor 10 when such high voltage is impressed on it.

In a particular case where the frequency of the power current on the conductor 15 was 60 cycles per second, and the voltage was 115, a motor 10 as described in the above mentioned patent was utilized in which the armature coil 16 had an inductance of about 17½ henrys and each of the condensers 29 and 30 was about .4 of a microfarad. The armature coil 16 had an effective resistance of about 3300 ohms and about 230 volts appeared across the armature coil 16 when the switch 22 was closed.

The switch 23 is connected between the conductor 31 and that one of the main conductors to which the switch 22 is connected through resistance 33. When the switch 22 is closed, opening of the switch 23 connects the condenser 30 between the conductors 15, and thus applies the main voltage across the condenser 29 and the armature coil 16 in series. Since the condenser 29 resonates with the coil 16, just as the condenser 30 resonates with it, the coil 16 is energized to operate the motor 10 upon opening of the switch 23, just as it is upon opening of the switch 22.

If both switches 23 and 22 are closed, both conductors 31 and 32 are connected to the same one of the main conductors 15, and opposite instantaneous voltages of like phase are impressed across the condensers so that the armature coil 16 is effectively short circuited. The resistance 33 is of such low value that it does not prevent this short circuiting. The purpose of the resistance 33 is to protect the contacts of the switch 22 from destructive arcing which may occur when the switch 22 closes while the switch 23 is closed. The contacts of the switch 23 may be made large and rugged enough to stand such arcing, but the contacts of the switch 22 must be made light in order to respond readily to carrier current impulses. In the particular case described above, in which the condensers 29 and 30 each had a value of .4 microfarad and the armature coil 16 had an inductance of about 17½ henrys, and a resistance of about 3300 ohms, it was found that the resistance 33 performed satisfactorily in protecting the contacts of the switch 22 when it had a value of about 150 ohms. If both switches 22 and 23 are open, the armature coil 16 is connected only to one of the conductors 15 through the condensers 29 and 30.

Operation of the motor 10 is therefore caused whenever an impulse of carrier current appears across the main conductors 15 and one of the switches is open and one of the switches is closed. The motor 10 does not operate when both switches are open or when both switches are closed.

Both contacts of switch 23 are movable. One of the contacts of the switch 23 is carried on a resilient arm 40 whose other end is fixed to a rigid support (not shown). The other contact of the switch 23 is carried upon a movable portion of a resilient arm 41, of which one end is fastened to a rigid support (not shown). The outer end of the rotating arm 12 is adapted to cooperate with the movable end 40a of the resilient member 40 so as to close the contacts of the switch 23 whenever the arm 12 is in its standby position. There are three notches 42, 43 and 44 on the face of the cam 14 so arranged that the free end of the resilient member 41 can move to close the contacts of the switch 23 whenever any one of these notches is in a position receiving the end of member 41. The relation between the arm 12, the resilient members 40 and 41, the contacts of the switch 23, and the notches 42, 43 and 44 in the cam 14 are such, however, that the contacts of the switch 23 cannot be closed except when the free end of the movable member 41 has moved into one of the notches 42, 43 or 44 and simultaneously the arm 12 tends to hold the free end of the movable member 40 away from the movable member 41. In other words, if the arm 12 is out of engagement with the portion 40a of the movable member 40, motion of the movable member 41 is insufficient to close the contacts of the switch 23. Similarly, if the free end of the movable member 41 is not in one of the notches 42, 43 or 44, movement of the movable member 40 induced by the arm 12 is insufficient to close the contacts of the switch 23.

Since the arm 12 is keyed to the shaft 11, as explained previously, it turns with the shaft 11, and acts to stop the motor 10, shaft 11, and arm 12 in a predetermined standby position, provided no carrier current impulse on the conductors 15 opens the switch 22 while the switch 23 is open, so as to stop the motor 10 before the arm 12 reaches the movable member 40. As explained above, the free end of the movable member 41 must be in one of the notches 42, 43 or 44 in order that the arm 12 may lift the movable member 40 to cause the contacts of the switch 23 to close and stop the motor 10 in such predetermined positions.

Means are provided whereby a driving connection is established between the rotating disc member 13 and the cam 14 whenever the free end of the movable member 41 is not in one of the notches 42, 43 or 44. This driving means includes a pair of axially displaced shoulders 50 and 51 formed by notches or recesses in the periphery of the rotatable disc member 13, which shoulders cooperate with pins 52 and 53 which are slidably journaled in respective projections 55 and 56 on the face of the cam 14. These pins are provided with enlarged heads 58 and 59, respectively, at the end toward the shaft 11 so that it cannot move through the corresponding projections 55 or 56 radially away from the shaft and thereby fall free from the cam 14. Each of the pins is, however, free to slide inwardly so that its inner end bears against the rotatable disc member 13 and so that its enlarged end can bear against a corresponding shoulder 50 or 51 of the member 13 to provide a driving connection between the member 13 and the cam 14, if the pin is in a position to fall in the corresponding notch.

The projection 55 from the cam 14 is longer than the projection 56 so that the pin 52 bears against the shoulder 50 of the member 13, while the pin 53 bears against the shoulder 51 thereof.

The pins 52 and 53 are formed of magnetic material, and cooperate with a mechanism 61 of magnetic material and extending from the magnetic core 17 of the motor 10. This mechanism 61 comprises a member 61a attached at the end to the yoke 17 and an armature 61b pivotally connected to member 61a, one end of which ends just above one of the pins whenever such pins are in the topmost position. For example, as shown in Fig. 1, the end 59 of the pin 53, which is in the topmost position, bears against the periphery of the rotating disc member 13, and forms an air gap between its outer end and the armature 61b. This air gap is sufficiently small that when the motor 10 is in operation, a portion of the magnetic flux in the core 17 attracts the armature to the member 61a and the pins to the armature, thereby causing the pins to move upward and to be held against the armature and hence withheld from driving engagement with cam 13 except when desired. The air gap is, however, sufficient so that if the end 59 of the pin 53 were within the notch forming the shoulder 51 of the member 13, the gap would be so large that the magnetic flux from the armature 61b could not lift the pin 54. The member 13 in the illustrated embodiment is not only shaped to urge the pins into engagement with the armature but also to cause the pins to move the armature 61b into engagement with the member 61a. The armature is preferably unbalanced in weight so that the force of gravity tends to push the pins downward whenever the armature is deenergized whereby the effect of dirt or grease, which might otherwise cause sticking or hinder the magnetic action of the device, is minimized. While I have shown an unbalanced weight arrangement, a balanced armature provided with a suitable spring bias may be substituted.

The cam 14 is formed with a periphery divided into three portions of different radius. A first portion 62 is of the greatest radius, a second portion 63 is of intermediate radius, and a third portion 64 is of minimum radius. These three peripheral portions of the cam 14 cooperate with an operating member 65 of a pair of switches 66 and 67. The switch 66 controls the connection between a pair of conductors 68 while the switch 67 controls the connection between a pair of conductors 69. When the operating member 65 is in contact with the peripheral portion 64 of the cam 14, both switches 66 and 67 are closed. When the operating member 65 is in contact with the intermediate radius portion 63 of the cam 14, the switch 67 is opened and the switch 66 remains closed. When the operating member 65 is in contact with the portion 62 of maximum radius of the cam 14, both switches 66 and 67 are opened.

In one manner of operation of the apparatus, it is desired only that the switches 66 and 67 shall be opened and closed simultaneously at all times. When such is the case it is unnecessary to use the pin 53, and it may be removed from the projection 56, that projection being then unused.

The operation of the apparatus is as follows: The switches 66 and 67, as illustrated, are closed, the switch 22 is closed, since no carrier current is on the conductors 15, and the motor 10 is deenergized because the switch 23 is held closed by the arm 12 in the above mentioned predetermined position. Upon reception of a carrier current impulse on conductor 15, the switch 22 opens, the motor 10 is energized through switch 23 to turn the arm 12 and the rotating disc member 13, which is attached to the arm 12 for clockwise rotation therewith through a pin 70 fixed on the arm 12 and cooperating with one of a series of holes 71 in the face of the member 13. The arm 12 turns until the end of the movable member 40 is freed and the switch 23 opens.

As explained previously, when the switches 22 and 23 are both open, the motor 10 is deenergized. So long as the carrier current impulse continues on the conductors 15, therefore, the switch 22 remains open, and the motor 10 remains deenergized. At the end of the carrier current impulse, the switch 22 closes, and the motor 10 becomes energized through the switch 22. After the motor again begins to run, it continues to turn the arm 12 through a complete cycle of operation until it returns to the predetermined position and moves the free end of the movable arm 40 outwardly to close the switch 23, provided the free end of the movable member 41 is in one of the notches 42, 43 or 44. The pin 53 during the energization of the motor 10 is attracted to the armature 61b and does not bear against the periphery of the member 13.

As the motor continues to rotate, if a second carrier current impulse is received, the switch 22 opens to deenergize the motor 10 and allow the pin 53 to drop to the periphery of the member 13. When such carrier current impulse ceases, the switch 22 again closes and the motor 10 is reenergized to continue operation. If, at the time of reception of this carrier current impulse, the notch forming the shoulder 51 was not under the enlarged end 59 of the pin 53, the pin 53 could not drop so far that it would not be lifted again by the magnetic action in the armature 61b. Thus, provided no carrier current impulse is received while the notch forming the shoulder 51 is under the pin 53, the motor 10 operates to return the arm 12 to its initial position, where the switch 23 is closed, thereby stopping the motor.

If, however, such second carrier current impulse is received at the instant the notch forming the shoulder 51 is directly under the pin 53, the pin drops within the notch, and the magnetic action in the armature 61b is not sufficient to raise the pin 53 therefrom. When such carrier current impulse ceases, the motor is reenergized, but the pin 53 is not lifted, so that, when the arm 12 and member 13 begin again to rotate, the shoulder 51 bears against the enlarged head 59 of the pin 53 so that the cam 14 is carried with the arm 12 and member 13. As soon as the cam 14 rotates, the movable end of the arm 41 moves out of the notch 42, thereby assuring that the switch 23 must remain open, even though the arm 12 moves past the free end 40a of the movable member 40.

After the cam 14 has been moved through an angle of about 90°, the free end of the movable member 41 enters the notch 43, and forces the cam 14 ahead through a small angle while slipping down the sloping bottom of the notch 43. Since the pin 53 is at this time approximately horizontal, it does not move from the notch which forms the shoulder 51, and the motor 10 continues to rotate so that the member 13 thereupon forces the pin 53 and cam 14, through the shoulder 51, to cause further rotation of the cam.

After the cam 14 has moved about 180°, the free end of the movable member 41 slips down into the notch 44 and again moves the cam 14 ahead through a small angle, so that the enlarged end 59 of the pin 53 is freed from the shoulder 51. The pin 53 thereupon drops through the projection 56 until it is stopped by its enlarged head 59. Thereafter the arm 12 and member 13 continue rotation until the arm 12 encounters the free end 40a of the movable member 40 and closes the switch 23, thereby deenergizing the motor 10.

As the apparatus thus remains, with the cam 14 moved through 180°, the peripheral portion 62 of maximum radius of the cam 14 is under the operating member 65 of the switches 66 and 67, so that these switches are both opened. The apparatus is in readiness for a further operation upon the receipt of other carrier current impulses.

If now another carrier current impulse is received, the switch 22 opens and energizes the motor 10 to move the arm 12 so that the switch 23 is opened, at which time the motor 10 becomes deenergized. When the carrier current impulse stops, the switch 22 closes, so that the motor 10 is reenergized through the switch 22. If no further carrier current impulse is received, or if a carrier current impulse is received when the notch forming the shoulder 50 is not under the pin 52, which is now in its uppermost position, the motor 10 continues running, except during the reception of carrier current impulses, and finally returns the arm 12 to the predetermined position where it closes the switch 23 without rotating the cam 14. If, however, during the rotation of the arm 12 and the member 13, another carrier current impulse is received at the instant when the notch forming the shoulder 50 is under the pin 52, the pin 52 is released by the projection 61b and dropped into the notch forming the shoulder 50. After such carrier current impulse stops, the projection 61b cannot lift the pin 52 again, so that upon further rotation of the arm 12 and member 13, the cam 14 is carried along.

After the cam 14 has rotated another 180°, the free end of the movable member 41 drops within the notch 42, thereby causing the cam 14 to move forward slightly and release the pin 52 from the notch forming the shoulder 51 so that it drops downward to the position shown. Thereafter the arm 12 and member 13 continue rotating until the arm 12 closes the switch 23. Such operation moves the peripheral portion 62 of maximum radius from the operating member 65, thereby allowing the member 65 to drop to the peripheral portion 64 of minimum radius and close both the switches 66 and 67.

As thus described a complete operating cycle including the opening of both switches 66 and 67, and their subsequent simultaneous closure, has been described. It should be noted that the operation of the cam 14 depends on the reception of two consecutive carrier current impulses spaced by a predetermined amount. In order to open both of the switches 66 and 67, two consecutive carrier current impulses must be received spaced by a predetermined amount. In order to close both these switches, two consecutive carrier current impulses must be received, spaced by a different predetermined amount. The necessary spacing between the two carrier current impulses required for operation of cam 14 depends on the angular distance between the shoulders 50 and 51 and the arm 12. The fact that different spacings between the two impulses are required for the opening and for the closing of the two switches results from the fact that the shoulders 50 and 51 are spaced by different amounts angularly from the arm 12. The angular spacing of the shoulders 50 and 51 from the arm 12 may be adjusted by sliding the arm 12 outward along the shaft 11, to which it is keyed, until the pin 70 is released from the hole in which it is engaged. The rotating disc member 13 may then be rotated through any desired angle to adjust the angular spacing between the shoulders 50 and 51 in the arm 12, and the pin 70 may thereupon be reinserted in the appropriate hole 71.

Various forms of the cam 14 may be used, other than that shown. Furthermore, the cam surfaces 62, 63 and 64 need not necessarily be at the periphery of the cam 14, but may instead be displaced axially, thereby to produce an axial movement of an operating member such as a member 65. Any other suitable form of cam surfaces may be used if desired.

Additional means for opening only one of the switches 67 or 66 may be employed if desired, as described in the above-mentioned copending application.

The above described arrangement is advantageous because energy stored in the motor field at the termination of the second carrier-current impulse is dissipated in an oscillatory discharge through the capacitors 29 and 30. Since each capacitor resonates with the motor at the supply frequency, the resonant frequency of the motor and the two capacitors in series is 84 cycles. The stored magnetic energy in the motor is dissipated gradually during three or four cycles while the iron core 17 and the members 61a and 61b go through a number of decreasing hysteresis loops which render the magnetic material substantially demagnetized. Under this condition the release of the pins is very positive. Normally the action of the capacitors 29 and 30 across the line is not objectionable because power factor correction is provided at the supply frequency.

The above principle is generally applicable to any device subject to residual magnetic effects. For example, there is shown in Fig. 2 a relay 75 having a winding 76 across a source of voltage 77. A condenser 78 is connected across the winding 76 so that, in a manner similar to that described above, the release of the armature 79 and therefore the closing of the contacts of the switch operated thereby, is rendered more positive.

In Fig. 3 there is illustrated a modification of the arrangement shown in Fig. 1 which is particularly adapted for use as an air raid warning signalling system, for example. The apparatus is generally similar to that shown in Fig. 1 and corresponding parts are indicated by the same numerals employed in Fig. 1. The operating disc 13' is provided with four recesses or slots 80, 81, 82 and 83 around slightly less than one-half the circumference of the disc, the four recesses corresponding to the white, yellow, blue, and red warning signals of a typical air raid warning system.

The cam or operating member 13' is generally circular but has cam surfaces as indicated for elevating the pins 52 and 53. The cam 14' is similar in arrangement to the cam 14 of Fig. 1 except that instead of having a plurality of depressions 42, 43, and 44, there are provided two grooves, 84 and 85, each of which is concentric with respect to the edge of the cam and is slightly less than one-half the circumference of the cam in length. The grooves are so disposed that the free end of the operating arm 41 normally rests in the groove. The cam member 14' is generally circular in shape and has two laterally extending cam surfaces or extensions, 86 and 87, at diametrically opposite points of the cam.

In order to provide a visual indication, I have illustrated the use of a disc 88 containing a plurality of differently colored spaces behind which there may be disposed a lamp 89 for illuminating the space in front of the lamp. The disc 88 is suitably carried by the cam 14'. Thus, for example, if a red warning signal is in effect, the cam 14' will have been turned to such a position that the red space is in front of the lamp and anyone viewing the device is apprized of the fact that a blackout is in effect. A suitable hood may be provided so that one using the device will be aware only of the current warning signal. An audible signal may be provided at the same time as, for example, a warning device 90 such as a bell or buzzer. In order to energize the lamp 89 and the warning device 90, there is provided a switch device 91 having an operating arm 92 carrying a contact 93 and a second arm 94 carrying a contact 95. The switch is normally open so that in the standby position of the apparatus no signal or warning is given because the engagement between the shoulder or cam surface 86 or 87 with the end of the arm 92 opens the contacts 93, 95. Immediately after rotation of the cam 14' the operating arm 92 drops to the surface 96 of the disc or cam 14' and the contacts 93, 95 are closed to energize the lamp 89 and the alarm 90. The visual, or the audible, or both signals if both are provided, will continue until the switch 91 is again moved to its open position.

The method of operation of the apparatus shown in Fig. 3 is the same as that illustrated in Fig. 1. Let it be assumed that the apparatus is in the standby position shown in Fig. 3. In this position, contacts 93—95 are open deenergizing light 89 and buzzer 90. Upon reception of a carrier current impulse on conductors 15 the switch 22 opens, the motor 10 is energized through the switch 23 to turn the arm 12 and the rotating disc member 13' which is attached to the arm 12 for clockwise rotation. The arm 12 moves until the end of the movable member 40 is freed from the contact 40a, as hitherto described, and the switch 23 opens, which deenergizes the motor 10. At the end of the carrier current impulse the switch 22 closes, the motor 10 is again energized through that switch, the motor again begins to run and continues to turn the arm 12, in the absence of a second carrier current impulse, through a complete cycle of operation until it returns to the standby position and moves the free end of the movable arm 40 to close the switch 23 and cause deenergization of the motor 10.

Let it be assumed that the notches 80, 81, 82 and 83 correspond to the white, yellow, blue and red warning signals and that it is desired to notify authorized persons of a yellow signal. In such a case a second carrier current impulse will be applied to the lines 15 at the time the notch 81 is under the pin 53. This, as hitherto explained, causes the motor 10 to be deenergized and the pin 53 moves downwardly into the notch. Upon termination of the second carrier current impulse the motor 10 is again energized and engagement between the head 59 of the pin 53 and the wall 81a of the notch 81 will cause movement of the cam 14' and disc 88. After a very slight movement the switch operating arm 92 drops against the surface 96, as hitherto explained, the light 89 is energized, and buzzer 90 sounds a warning that a change of condition of the apparatus is taking place. The motion continues until the arm 12 returns to its normal position which causes the switch 23 to be closed. At this time the cam 14' will have rotated almost 180° and the arm 41 will be in the opposite end of the groove 84 from the position shown in Fig. 3. The yellow space on the disc 88 is illuminated by lamp 89 and the buzzer continues to sound.

Let it now be assumed that it is desired to change the signal as, for example, to notify users of the apparatus that a blue signal is in effect. A carrier current impulse will be applied to the conductors 15 which causes energization of the motor. Under the assumed conditions the pin 53 is still in engagement with the shoulder 81a. As previously described the arm 12 moves away from the standby position and the apparatus halts. After termination of the carrier current impulse rotation again begins. After a short interval the arm 41 begins to slide down the inclined surface at the beginning of groove 85 which causes the cam 14' to be moved ahead a slight amount so that the pin 53 is enabled to drop out of engagement with the shoulder 81. Rotation of cam 13' continues. When the notch 82 arrives below the pin 52, receipt of another carrier current impulse will cause the pin 52 to be dropped into that notch, following which the cam 14' and the disc 88 will be moved to a position in which the blue signal will be seen by the user of the apparatus.

Let it now be assumed that the user of the apparatus desires to return the apparatus to the standby position, as for example, in order to eliminate the annoyance occasioned by the continuous operation of the buzzer which would otherwise occur until the next operation of the receiver by the remote transmitter. For this purpose there is provided a manual reset button 97 located in one of the conductors 15 and having normally closed contacts 98. If the pushbutton is operated to open the contacts 98 the motor 10 will be energized and the apparatus will be returned to the standby position shown in Fig. 3 as was described in connection with Fig. 1. The apparatus may also be reset by the transmission from the transmitter of a carrier current impulse which will cause the same operation as that initiated by the manual reset button. It is necessary to return the apparatus to its standby condition to cause cessation of an alarm or other indication of operation.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In a carrier current control receiver for producing a control operation in response to the reception of two carrier current impulses having a predetermined interval therebetween, said interval being computed only when carrier current is not received, motor means for causing said control operation upon energization for said predetermined interval, and means for energizing said motor in response to the reception of a first carrier current impulse and for deenergizing said motor in response to the reception of the second carrier current impulse, said means comprising a pair of impedances connected in series across said motor, means for normally impressing opposite voltages across said impedances whereby the terminals of said motor are at the same potential, and means responsive to the reception of the first carrier current impulse for disconnecting the voltage impressing means from one of said impedances in order to energize said motor.

2. In a carrier current control receiver for producing a control operation in response to the reception of two carrier current impulses having a predetermined interval therebetween, said interval being computed only when carrier current is not received, motor means for causing said control operation upon energization for said predetermined interval, and means for energizing said motor in response to the reception of a first carrier current impulse and for deenergizing said motor in response to the reception of the second carrier current impulse, said means comprising a pair of impedances connected in series across said motor, means for normally impressing opposite voltages across said impedances whereby the terminals of said motor are at the same potential, means responsive to the reception of the first carrier current impulse for disconnecting the voltage impressing means from one of said impedances in order to energize said motor, and means responsive to the reception of the second carrier current impulse for disconnecting both of said voltage impressing means in order to deenergize said motor.

3. In a carrier current control receiver for producing a control operation in response to the reception of two carrier current impulses having a predetermined interval therebetween, said interval being computed only when carrier current is not received, motor means for causing said control operation upon energization for said predetermined interval, and means for energizing said motor in response to the reception of a first carrier current impulse and for deenergizing said motor in response to the reception of the second carrier current impulse, said means comprising a pair of impedances connected in series across said motor, means for normally impressing opposite voltages across said impedances whereby the terminals of said motor are at the same potential, means responsive to the reception of the first carrier current impulse for disconnecting the voltage impressing means from one of said impedances in order to energize said motor, means responsive to the reception of the second carrier current impulse for disconnecting both of said voltage impressing means in order to deenergize said motor, said carrier current responsive means being arranged for reconnecting one of said voltage impressing means upon the termination of said second impulse whereby said motor is energized to return the apparatus to its normal position whereupon said opposite voltages are again impressed across said impedances.

4. In a carrier current control receiver for producing a control operation in response to the reception of two carrier current impulses having a predetermined interval therebetween, said interval being computed only when carrier current is not received, motor means for causing said control operation upon energization for said predetermined interval, and means for energizing said motor in response to the reception of a first carrier current impulse and for deenergizing said motor in response to the reception of the second carrier current impulse, said means comprising a pair of impedances connected in series across said motor, means for normally impressing opposite voltages across said impedances whereby the terminals of said motor are at the same potential, said motor being energized by separate disconnection of either of said voltage impressing means but being deenergized by simultaneous connection of both of said voltage impressing means.

5. In combination, in a carrier current control receiver of the type having a motor and a pair of impedances connected in series across said motor, means for normally impressing opposite voltages across said impedances whereby the terminals of said motor are at the same potential, means responsive to the reception of carrier current for disconnecting the voltage impressing means from one of said impedances in order to energize said motor through the other of said impedances, and means responsive to motion of said motor for disconnecting the voltage impressing means from the other of said impedances, whereby said motor is energized whenever either of said means impresses voltage across the respective impedance, but said motor is deenergized whenever both of said means are effective simultaneously to impress opposite voltages across said two impedances or to disconnect said voltages from both of said impedances.

6. In a carrier current control receiver of the type producing a control operation in response to the reception of two carrier current impulses and comprising a driving member and a driven member arranged to produce said control operation upon motion thereof, said members being normally disengaged from each other, a member of magnetic material carried by said driven member and adapted for engagement with said driving member, means for causing motion of said driving member after reception of the first of said carrier current impulses, magnetic means for causing said magnetic member to be withheld from driving engagement with said driven member during energization of the motor except during predetermined intervals, and means for rendering said magnetic means substantially demagnetized by an oscillatory discharge for causing said magnetic member to be released for driving engagement with said driven member at a predetermined time in order to produce said control operation in response to the reception of the second of said carrier current impulses.

7. In a carrier current control receiver of the type producing a control operation in response to the reception of two carrier current impulses and comprising a driving member, a driven member arranged to produce said control operation upon motion thereof, said members being normally disengaged from each other, a member of magnetic material carried by said driven member and adapted for engagement with said driving member, an electric motor for causing motion of said driving member after reception of the first of two sequential carrier current impulses, said motor comprising an armature structure including a core of magnetic material and a winding, magnetic means for causing said magnetic member to be withheld from driving engagement with said driving member except when desired, said last mentioned means comprising a second member of magnetic material, one portion of which is so disposed with respect to said core that said second member is magnetized during the operation of said motor and another portion of which is disposed adjacent said first mentioned magnetic member for withholding said first magnetic member from driving engagement with said driven member except during predetermined intervals, and means for causing substantial demagnetization of said magnetic means by an oscillatory discharge for releasing said first mentioned magnetic member for driving engagement with said driven member to produce said control operation in response to the reception of the second of the carrier current impulses.

8. In a carrier current control receiver of the type producing a control operation in response to the reception of two carrier current impulses and comprising a driving member, a driven member arranged to produce said control operation upon motion thereof, said members being normally disengaged from each other, a member of magnetic material carried by said driven member and adapted for engagement with said driving member, an electric motor for causing motion of said driving member after reception of the first of two sequential carrier current impulses, said motor comprising an armature structure including a core of magnetic material and a winding, magnetic means for causing said magnetic member to be withheld from driving engagement with said driving member except when desired, said last mentioned means comprising a second member of magnetic material, one portion of which is so disposed with respect to said core that said second member is magnetized during the operation of said motor and another portion of which is disposed adjacent said first mentioned magnetic member for withholding said first magnetic member from driving engagement with said driven member except during predetermined intervals, and means for causing substantial demagnetization of said magnetic means by an oscillatory discharge for releasing said first mentioned magnetic member for driving engagement with said driven member to produce said control operation in response to the reception of the second of the carrier current impulses, said last mentioned means comprising a pair of condensers connected in series across said winding and across said source of power after the termination of a cycle of operation.

9. In a carrier current control receiver of the type producing a control operation in response to the reception of two carrier current impulses and comprising a driving member, a driven member arranged to produce said control operation upon motion thereof, said members being normally disengaged from each other, a member of magnetic material carried by said driven member and adapted for engagement with said driving member, an electric motor for causing motion of said driving member after reception of the first of two sequential carrier current impulses, said motor comprising an armature structure including a core of magnetic material and a winding, magnetic means for causing said magnetic member to be withheld from driving engagement with said driving member except when desired, said last mentioned means comprising a second member of magnetic material, one portion of which is so disposed with respect to said core that said second member is magnetized during the operation of said motor and another portion of which is disposed adjacent said first mentioned magnetic member for withholding said first magnetic member from driving engagement with said driven member except during predetermined intervals, and means for causing substantial demagnetization of said magnetic means by an oscillatory discharge for releasing said first mentioned magnetic member from driving engagement with said driven member to produce said control operation in response to the reception of the second of the carrier current impulses, said another portion comprising a member pivotally carried by said one portion, said another portion engaging said one portion adjacent one end thereof and adapted to engage the first mentioned magnetic member at the other end thereof, and means for urging said another portion in a direction to move said first magnetic member into engagement with said driven member.

10. In a carrier current control receiver, a motor having an armature structure comprising a core of magnetic material and a winding having a pair of terminals, a source of alternating voltage of predetermined frequency impressed on said winding during predetermined intervals, both of said terminals being connected to one side of said source at other times, a pair of condensers connected in series across said winding, a point between said condensers being connected to the other side of said source, each of said condensers being of such a value of capacity as to resonate with said motor at some frequency whereby magnetic energy stored in said motor during a control operation is dissipated at the end of a cycle of operation by means of an oscillatory discharge.

11. In a carrier current control receiver for producing a control operation in response to the reception of two carrier current impulses having a predetermined interval therebetween, the combination of a driving member, a driven member arranged to produce said control operation upon motion thereof, means for causing motion of said driving member after reception of the first of two sequential carrier current impulses, means for causing engagement between said members to produce said control operation in response to the termination of the first and reception of the second of said two sequential carrier current impulses, and manual means for causing said members to be returned to their starting positions after the termination of said control operation.

12. In a carrier current control receiver for producing a control operation in response to the reception of two carrier current impulses having a predetermined interval therebetween, the combination of a driving member, a driven member arranged to produce said control operation upon motion thereof, motor means for causing motion of said driving member after reception of the first of two sequential carrier current impulses, means for causing engagement between said members to produce said control operation in response to the termination of the first and reception of the second of said two sequential carrier current impulses, and means associated with said receiver for energizing said motor means to cause said members to be returned to their starting position after the termination of said control operation.

13. In a carrier current control receiver for producing a control operation in response to the reception of two carrier current impulses having a predetermined interval therebetween, the combination of a driving member, a driven member arranged to produce said control operation upon motion thereof, means for causing motion of said driving member after reception of the first of two sequential carrier current impulses, means for causing engagement between said members to produce said control operation in response to the termination of the first and reception of the second of said two sequential carrier current impulses, and means for causing said members to be returned to their starting positions after the termination of said control operation and reception of a third carrier current impulse.

JOHN L. WOODWORTH.